April 21, 1925.
H. BURKHARDT ET AL
HYDRAULIC TILTING DEVICE
Filed July 10, 1923
1,534,439
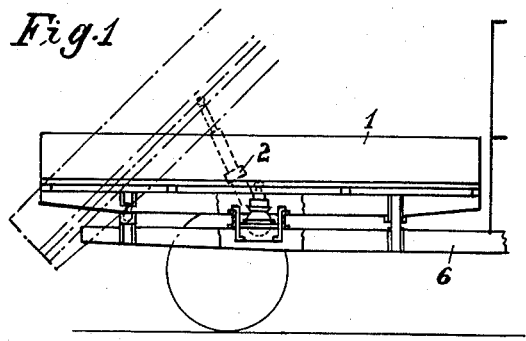
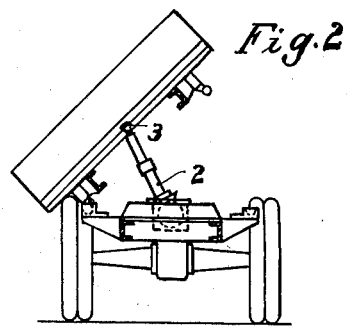
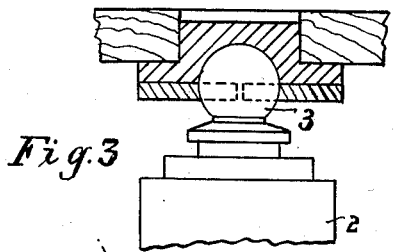
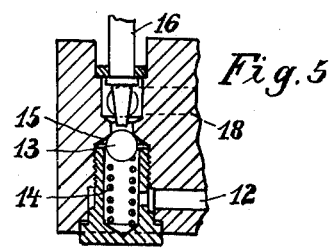
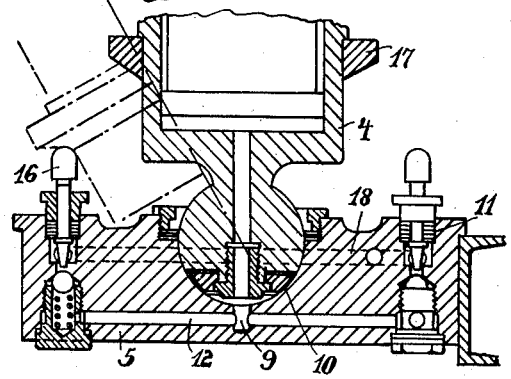
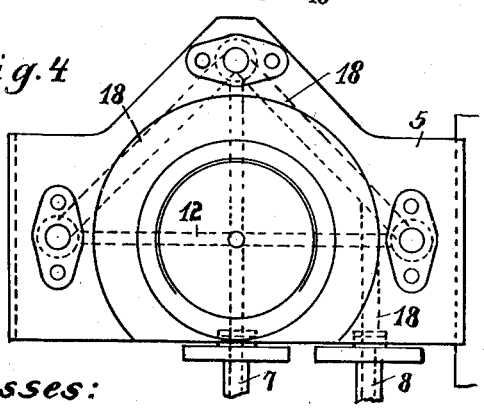
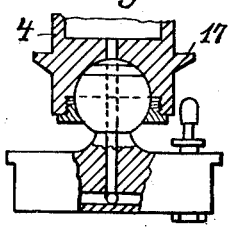
Witnesses:
Alfred Salzwedel
Elisbeth Nash
Inventors:
Hans Burkhardt and
Ernst Wing
by Jos Mark
      attorney Patented Apr. 21, 1925.

1,534,439

UNITED STATES PATENT OFFICE.

HANS BURKHARDT, OF ZOLLBRUCK, AND ERNST WIRZ, OF STAFA, SWITZERLAND.

HYDRAULIC TILTING DEVICE.

Application filed July 10, 1923. Serial No. 650,724.

*To all whom it may concern:*

Be it known that we, HANS BURKHARDT and ERNST WIRZ, citizens of the Swiss Confederation, residing at, the 1st, Zollbruck, Switzerland, the 2nd, Stafa, Switzerland, have invented certain new and useful Improvements in Hydraulic Tilting Devices, for which we have filed applications for patent in Germany Sept. 12, 1921, and Switzerland January 12, 1922, and of which the following is a specification.

Hydraulic tilting devices, for motor lorries, have become known in which the tilting is effected by means of a hydraulic jack mechanism bearing at the upper end against the carriage body and at the lower end against the carriage frame.

It has already been proposed, in order to make the jack movable in all directions, to mount this jack at the lower end by means of a Cardan joint. This arrangement has however the inconvenience that in order to avoid the use of movable connecting pipes the fluid under pressure must be admitted through the pivot bolt of the Cardan joint, whereby the construction becomes complicated and the packing is rendered difficult. The Cardan joint of great dimension which is thus required is rather expensive.

It has further been proposed to make the lower wall of the pressure cylinder of semi-spherical shape and to mount the same in a semi-spherical cup. This arrangement requires however flexible conduits for the fluid under pressure, whereby the movability of the pressure cylinder in all directions is limited and wherefrom other inconveniences result.

This invention has for its object to avoid these inconveniences. According to the invention a hydraulic jack is mounted at the lower end by means of a special ball joint, one of the members of which (the ball or the ball cup), is stationary and both members are bored for the admission of the fluid under pressure into the pressure cylinder. In this manner stationary pressure conduits with normal connections to a stationary body may be used so that the above-mentioned inconveniences are avoided.

The invention will be best understood from a consideration of the following detailed description taken in connection with the accompanying drawings forming a part of this specification, with the understanding that while on the drawings two embodiments of the invention are disclosed, the invention is not confined to any strict conformity with the showing of the drawings, but may be embodied in any manner which does not make a material departure from the salient features of the invention.

In the drawings:

Fig. 1 shows in side elevation part of a motor lorry with tilting device.

Fig. 2 is a rear view the carriage body being tilted sidewards.

Fig. 3 shows on an enlarged scale the hydraulic jack in vertical section.

Fig. 4 is a plan view of Fig. 3.

Fig. 5 shows on an enlarged scale the valve in side elevation partly in vertical section.

Figs. 6 and 7 show modified forms of construction of the mounting of the hydraulic jack.

For the tilting of the carriage body 1 a hydraulic jack 2 is used in a manner known per se the upper end of which is mounted in the bottom plate of the carriage body by means of a ball joint 3. The lower part of the jack is mounted in the frame 6 of the carriage in the following manner. The jack cylinder 4 terminates at the lower end by a ball which has a bore for the fluid under pressure. This spherical end of the jack cylinder is rotatably mounted in a stationary cup 5 which has also bores for the fluid under pressure, a ball joint movable in all directions being thus formed through which the fluid under pressure can be conducted into the jack cylinder without the use of flexible conduits and without impeding the movability of this jack cylinder in all directions. With the ball cup or socket 5 the stationary inlet pipe 7 and the stationary outlet pipe 8 for the fluid under pressure are connected. As the ball socket is stationary these connections may be made in usual, normal and simple manner. The fluid under pressure enters into the jack cylinder 4 through the inlet 9 which has packings 10.

In order to limit the stroke of the hydraulic jack the following arrangement has been made: At each side to which the carriage body has to be tilted, in the present case at the rear end and at the right and left, the ball socket 5 has a bore 11 which communicates on the one hand with the supply pipe 7 for the fluid under pressure through the intermediary of channels 12 and on the other hand through the intermediary of channels 18 with the outflow pipe 8. In each bore a ball valve is arranged the ball 13 of which (Fig. 5) is pressed on its seat 15 through the action of a spring 14. A plunger 16 is movably arranged above the ball and guided by a stuffing box. On the jack cylinder an annular collar 17 is arranged above the ball joint designed to act upon the head of the corresponding plunger 16 when the cylinder is in the inclined position resulting from the tilting (Fig. 3 in dotted lines) so that this plunger is depressed, whereby the valve is opend. The inflow pipe 7 is thus made to communicate with the outflow pipe 8 and the admission of fluid under pressure into the cylinder is interrupted, whereby, without intermediate elements, for instance flexible traction elements (ropes, chains) which are liable to break, to get entangled or to fail for any other reason, an automatic limiting of the stroke is produced. For the purpose of interrupting the admission of fluid under pressure before the limit position is reached the plunger 16 may for instance be connected by a convenient lever system with a hand lever arranged in easy access near the driver's seat.

In the form of construction shown in Fig. 6 the lower end of the jack cylinder 4 is open the ball socket forms the bottom of the press cylinder.

Instead of making the ball socket stationary as in the forms of construction which have been described, the ball may be made stationary (Fig. 8) in which case the lower end of the cylinder is constructed as a movable ball socket.

This improved hydraulic jack may be used also for other purposes in all cases where movability in any direction is required.

We claim:—

1. A hydraulic tilting device for motor lorries comprising in combination a hydraulic jack, a ball joint at the lower end of said jack having a bore for the fluid under pressure and a stationary ball socket for said ball having bores for the inflow and outflow of the fluid under pressure and valves in said bores of the ball socket, a plunger for each of said valves and an annular collar on said press near the lower end designed to act on said plungers for opening the corresponding valve when said jack cylinder is in the inclined position.

2. A hydraulic tilting device for motor lorries comprising in combination a hydraulic jack, a ball joint at the lower end of said jack having a bore for the fluid under pressure, a stationary ball socket for said ball having passages for the inflow and outflow of the fluid under pressure, and valves for controlling the passage of fluid to the hydraulic jack, said valves having operating means located in the path of the jack in the tilting movement thereof and arranged to be directly engaged by the same to cut off the supply of fluid to the jack at the end of the tilting movement.

In testimony whereof we affix our signatures in presence of two witnesses.

HANS BURKHARDT.
ERNST WIRZ.

Witnesses:
WILLIAM HENARTH,
C. W. WILLIAMS.